INVENTORS
CLAYTON W. BROWN &
PAUL V. KEYSER JR.
BY
James Y. Cleveland
ATTORNEY

July 14, 1953
C. W. BROWN ET AL
2,645,461
THERMOREGULATOR
Filed Aug. 26, 1948
4 Sheets-Sheet 2
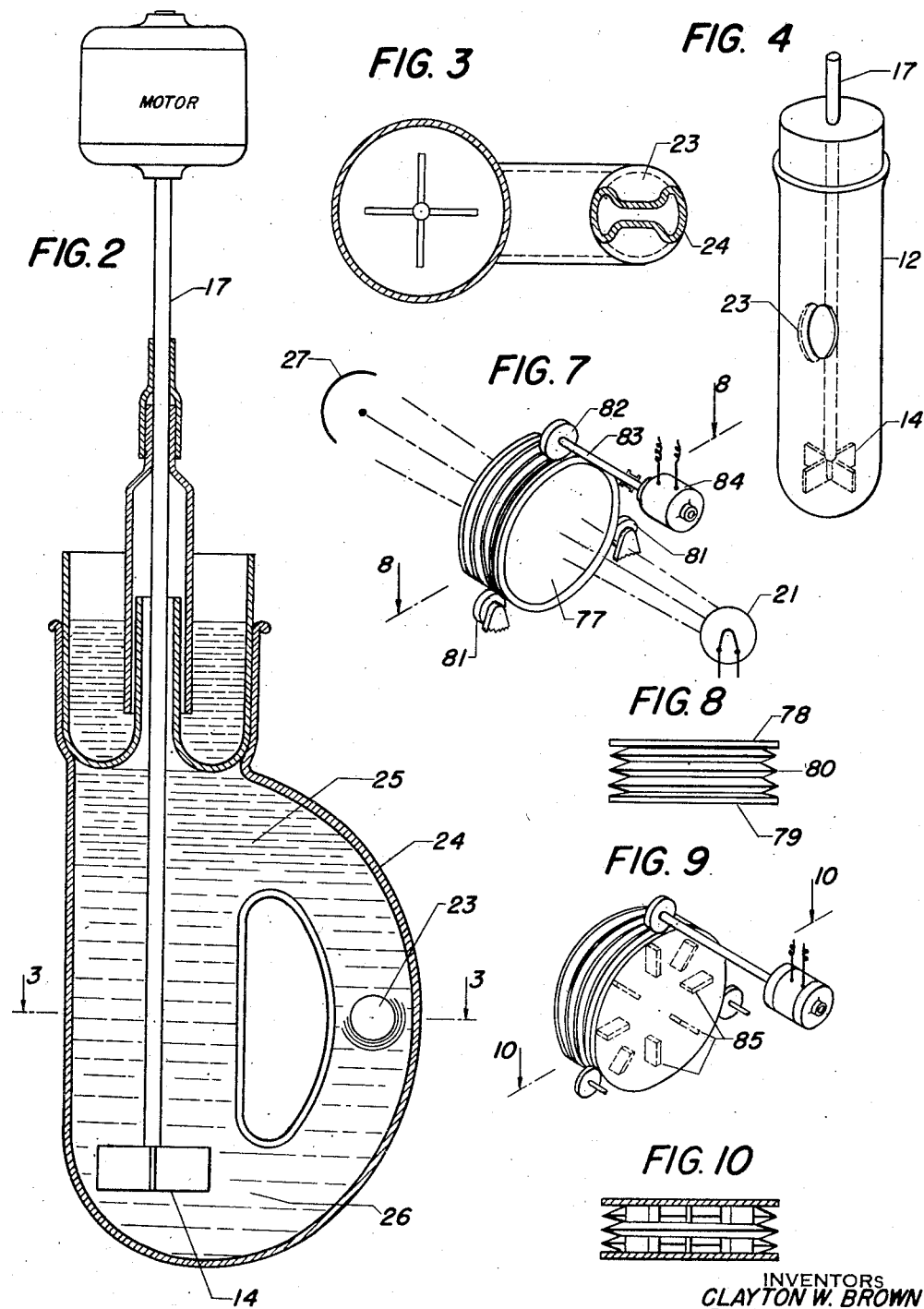
INVENTORS
CLAYTON W. BROWN &
PAUL V. KEYSER JR.
BY
James Y. Cleveland
ATTORNEY July 14, 1953  C. W. BROWN ET AL  2,645,461
THERMOREGULATOR
Filed Aug. 26, 1948  4 Sheets-Sheet 3

INVENTORS
CLAYTON W. BROWN &
PAUL V. KEYSER JR.
BY
James Y. Cleveland
ATTORNEY

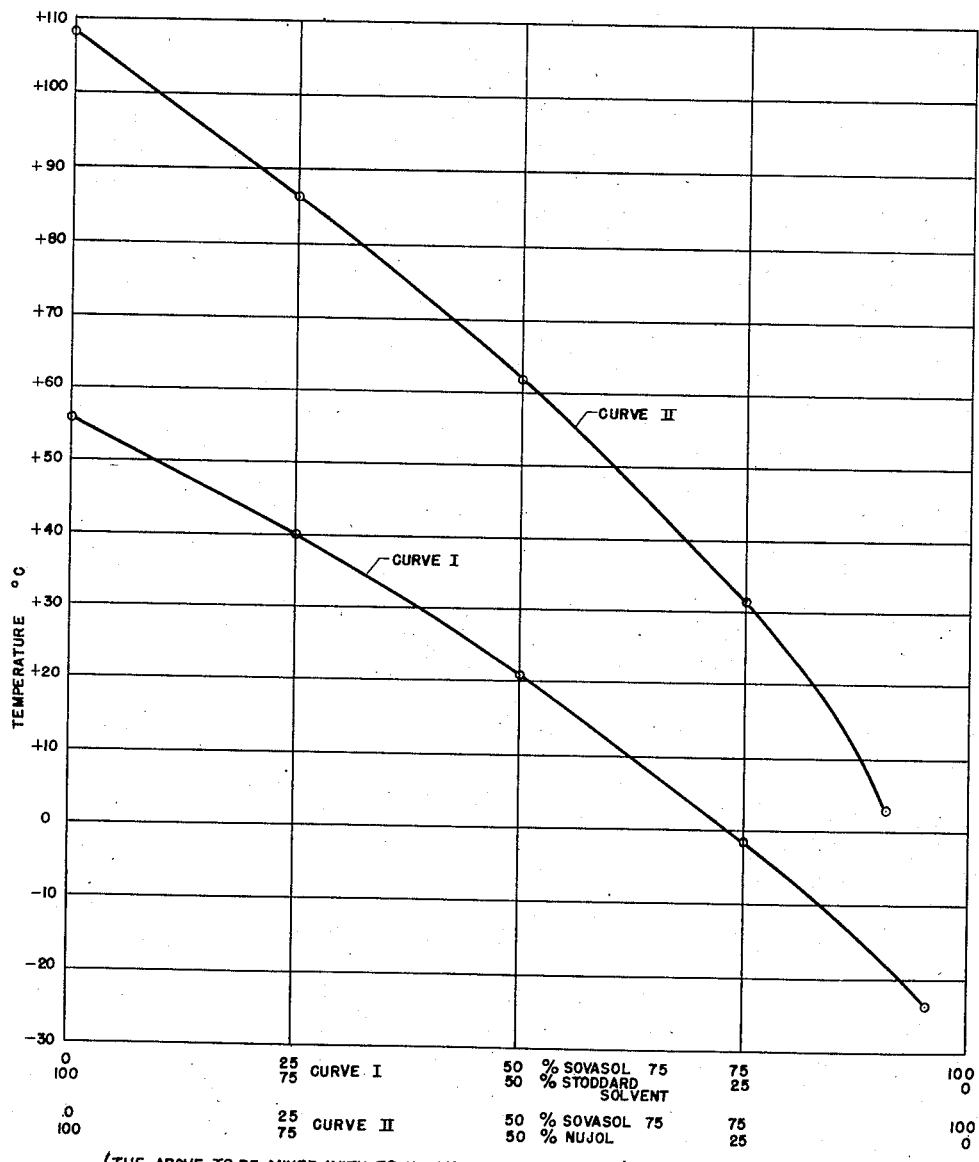

Patented July 14, 1953

2,645,461

UNITED STATES PATENT OFFICE 2,645,461

THERMOREGULATOR

Clayton W. Brown, Woodbury, N. J., and Paul V. Keyser, Jr., Douglaston, N. Y., assignors to Socony-Vacuum Oil Company, Incorporated, a corporation of New York Application August 26, 1948, Serial No. 46,222

7 Claims. (Cl. 257—4)

This invention relates to temperature regulators and more particularly to a method and apparatus for maintaining the temperature of fluids constant within an exceptionally narrow range.

Many types of thermoregulators are well known in the prior art. Outstanding among these are those which depend upon the expansion of mercury; the mercury U-tube which depends for its operation on a liquid with a relatively high coefficient of expansion together with mercury; bimetallic thermostats which depend upon the difference in the coefficient of expansion of metals; thermocouples; pyrometers; electrical bridge circuits having resistance elements sensitive to temperature changes; and many others. Most of these depend upon complicated auxiliary equipment, which is necessary, if the desired degree of accuracy of control is achieved. Those which do not depend on complicated auxiliary equipment are not adapted to the fineness of control desired.

The present invention provides a novel method and apparatus for maintaining the temperature of fluids, such as baths, constant within 0.1° C. and yet is so simple that anyone who can read a thermometer can practice the invention.

The automatic temperature regulator forming the subject matter of the instant application comprises a glass container containing a mixture of two or more partially miscible liquid materials selected in accordance with the temperature of the fluid that it is desired to maintain. In one form of the invention the liquid mixture is circulated in the container through a side arm thereof which has a flattened area in the form of a bull's eye. The lenses of the bull's eye are plane portions of the flattened walls of the side arm. The light beam is focused on the bull's eye which transmits the light to a photo cell. As the temperature of the fluid is altered the critical solution temperature or point of miscibility of the liquid mixture is reached, clearing and/or clouding of the liquid mixture occurs. The light being transmitted by the bull's eye will vary with the clearing and/or clouding of the liquid mixture producing a variation of the current output from the photo cell. The photo cell controls a relay system which in turn controls the alteration of the temperature of the fluid bath by turning on or shutting off the heat exchange mediums. For example, when the bath cools toward the desired temperature, the point of miscibility of the liquid mixture, the liquid mixture drops in temperature below the critical solution temperature and a clouding occurs which shuts off at least a portion of the light impinging upon a photo cell and a relay system is activated to apply heat to the fluid. When a substantially constant equilibrium temperature has been reached the cycles of clearing and clouding of the liquid mixture occur at uniform intervals and the relay controls the supply of coolant or heating energy to maintain the temperature of the fluid constant insofar as a temperature change can be detected by a standard laboratory thermometer. By internally effecting a heat exchange between the fluid and the heat exchange mediums while stirring the fluid, the intervals during which heating and cooling successively occur may be of the order of 20 to 30 seconds in a fluid bath of practical volume which is being uniformally circulated over the heat exchangers. For larger baths operating near room temperature the cycle may extend into minutes.

A feature of the present invention is that the apparatus is entirely automatic. Once it has been placed in operation the apparatus will cause the temperature of the bath to be altered to the desired temperature; will maintain the temperature constant at the desired temperature; and signal when this condition exists.

A practical form of signal means is two electric pilot lights which are respectively connected in the heat control and cooling control circuits so that they will flash intermittently when their respective circuits are energized. It is obvious that during the period directly following the instant at which the apparatus is set in operation only one of the lights will be lighted until the critical temperature has been reached, at which time heating and cooling occur in cycles and the two pilot lights will flash intermittently.

Another novel feature of the present invention resides in the provision of a mercury sealed container for two or more partially miscible liquid materials with critical solutions at the desired temperature. The provision of such sealed containers makes it possible to build units which have different critical solution temperatures which may be used interchangeably in the apparatus and can be used to maintain the temperature of a fluid bath at any desired temperature.

Other features of novelty will be disclosed hereafter in the detailed description of the invention.

The primary object of the present invention resides in the provision of a simple yet highly accurate method and apparatus whereby unskilled workmen can practice the present invention to maintain the temperature of a fluid bath constant to an accuracy of 0.1° C. or better.

Another object of the present invention resides in the provision of a thermoregulator which will maintain the temperature of a fluid bath constant by periodically activating a heater and/or a cooler which are controlled by a photocell operated relay system motivated by a light beam focused on the photocell through a mixture of two or more partially miscible materials that clears and/or clouds with temperature change and thus periodically intercepts the light beam.

Still another object of the present invention resides in the provision of automatic means for achieving the last recited object.

This invention also contemplates the provision of a flexible system which can be utilized to bring a fluid bath to any desired temperature and maintain the bath temperature constant at the desired temperature with a high degree of accuracy.

Another object of this invention resides in the provision of interchangeable cells containing critical solutions, each cell containing a mixture of solutions which is miscible at a different temperature.

Other objects of the present invention will become apparent from the following detailed description when read in the light of the drawings, in which Figure 1 is a diagrammatic illustration of a fluid bath showing elements of the present invention disposed therein and showing schematically the electrically controlled system associated with the elements;

Figure 2 is an enlarged, detailed, vertical sectional view of one form of a critical solution container;

Figure 3 is a horizontal cross-sectional view of the container shown in Figure 2 taken along the line 3—3 of Figure 1;

Figure 4 is a perspective view of still another form of critical solution container in which the bull's eye through which a film of fluid is caused to circulate is formed differently from that of the container shown in Figure 2;

Figure 7 is a perspective view of still another form of critical solution container in which the container is sealed and provision made for expansion of the solution. This figure also shows means whereby the container can be rotated to effect a stirring of the critical solution.

Figure 8 is a horizontal cross-sectional view of Figure 7 taken along the line 8—8;

Figure 9 is a diagrammatic illustration of another form of critical solution container having integral stirring vanes and further showing the manner in which the container is rotated to cause the vanes to stir the liquid therein;

Figure 10 is a horizontal sectional view taken along the line 10—10 of Figure 9; and Figure 11 is a graph of two curves representing the components of any critical solution required for use in controlling the temperature of a fluid bath over a range extending from −30° C. to +110° C.

Figure 1:
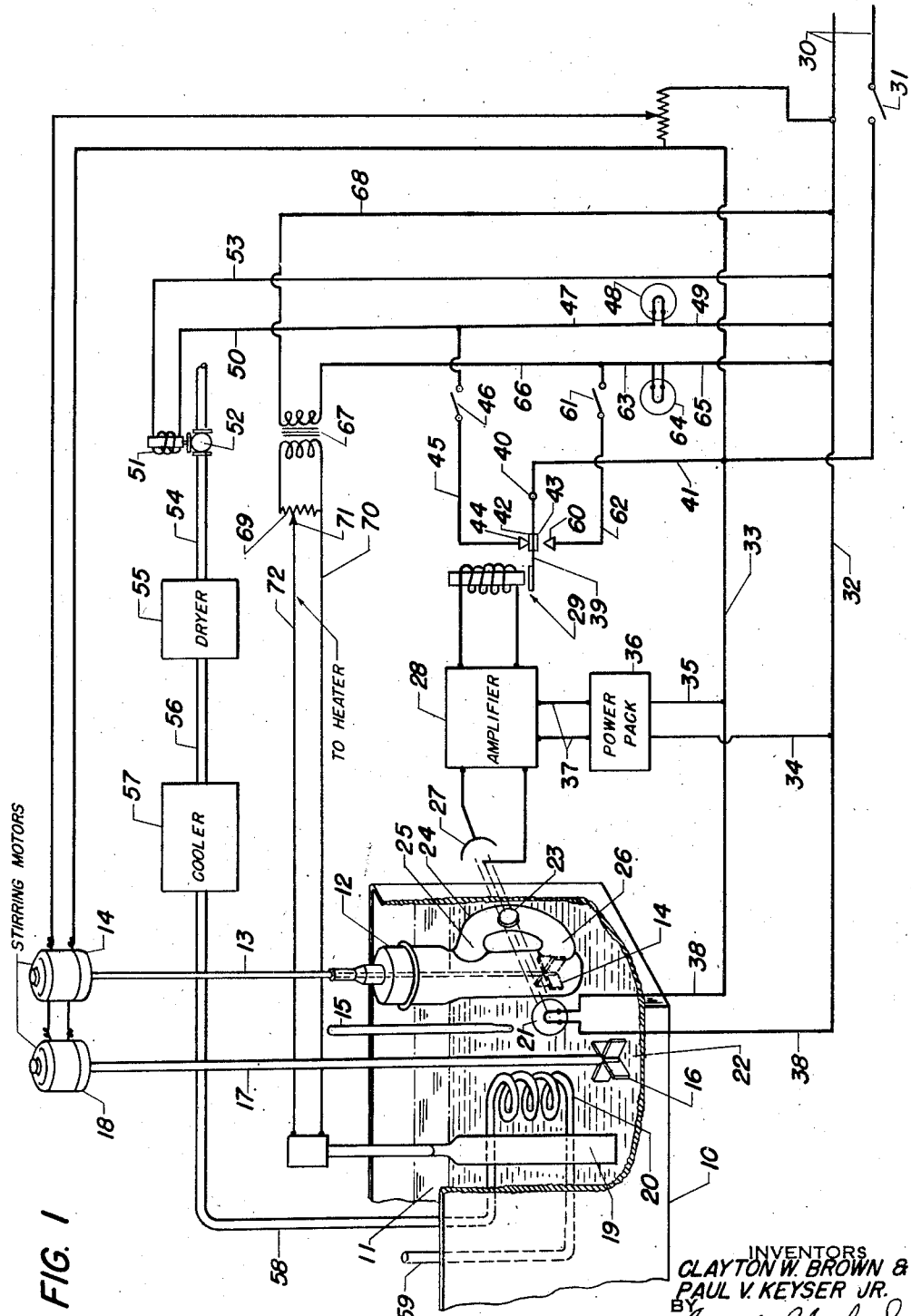

Referring to the drawings in details, particularly Figure 1, a container 10 is shown enclosing a bath 11 whose temperature it is desired to control. Disposed in the bath 11 by suitable supports, not shown, is a critical solution container 12 having extending thereinto a stirring rod 13 on the bottom end of which is a stirrer 14. The stirrer 14 is driven by means of the stirring rod 13 by a motor 14. Motor 14 is here shown as an electric motor. It is obvious that other motors can be used to perform the same function, for example, an air driven motor. There is also disposed in container 10 a thermometer 15 by means of which the temperature of the bath is indicated. A stirrer 16 is also disposed in the bath 11 and is driven through the medium of the stirring rod 17 by a motor 18 which, as pointed out in connection with motor 14, can be either electrically or air driven. A heater element 19 is also disposed in the bath 11 and serves to supply heat internally to the bath. Heater 19 is preferably of the electric type. In order to internally cool the bath 11 there is provided a cooling coil 20 through which a coolant such as air can be circulated to internally cool the bath 11.

In Figure 1 the container 10 may be formed of glass so that light from a source 21 can be transmitted through the wall 22 thereof and the fluid 11 in the container to impinge upon a bull's eye 23 formed in a side arm 24 of the critical solution container 12. Side arm 24, which is more clearly shown in Figures 2 and 3, is formed by securing to a substantially cylindrical container 12 at openings 25 and 26 the opposite ends of a U-shaped glass tube, preferably made of optical glass. Where the ends of the U-shaped tube engage the wall of the container 12 around the openings 25 and 26 the edges are streamlined to facilitate the circulation of the critical solution in the container and through the side arm 24.

The bull's eye 23 in side arm 24 is formed by heating the U-shaped tube at approximately its middle and pressing diametrically opposite sides toward each other against a spacer element. The implements used for pressing the opposite sides inwardly should have squared ends so that the finished bull's eye will have parallel plane lenses. The spacer used in forming the lenses for the bull's eye can vary in thickness but in practice it has been found that one that is from 1 to 2 mm. thick is suitable. By thus forming in the passageway of the side arm 24 a restricted passageway a thin film of the critical solution will be caused to circulate through the restricted passageway when the stirrer 14 is in operation. Light transmitted by the bull's eye 23 and the film of liquid therein is projected onto a photo cell 27.

Photo cell 27 is connected to an amplifier 28 which in turn supplies electrical energy for the operation of the relay system 29. Power is supplied from a conventional power line source not shown to the amplifier by means of the conductors 30, switch 31, conductors 32, 33, 34, 35, the power pack 36 and conductors 37. Switch 31 serves as a master switch through means of which the entire system may be energized. Closing of switch 31 also energizes, through conductors 38, the light source 21.

The electrical system controlled by the relay 29 can best be described in connection with the operation of the system. Armature 39 of the relay 29 is pivotally secured at one end of a support 40. This end of the armature is connected by means of a conductor 41 to the power source through master switch 31. Armature 39 carries at a point intermediate its end contacts 42 and 43 which are mounted on opposite sides of the armature. Contact 42 when the armature is in the position shown, engages a fixed contact 44 that is connected by means of conductor 45 through a switch 46 and conductor 47 to one side of a pilot light 48. The other side of the pilot light is connected by means of a conductor 49 to conductor 32 which is one of the power supply mains. Contacts 42 and 44 and switch 46 also control a circuit that is in parallel with the pilot light 48. This circuit includes the conductors 50, the winding 51 of a solenoid operated valve 52 in a coolant supply line and conductor 53 which is also connected to the power main 32. With the circuit described thus far, when the photocell 27 supplies enough current to amplifier 28 to energize the relay 29 to actuate it to the position shown, the pilot light 48 is lighted and the solenoid valve 52 is actuated to admit coolant from a source not shown through the conduit 54 to a dryer 55. The dried coolant passes from the dryer 55 through a conduit 56 to a cooler 57. The coolant flowing from the cooler 57 flows by means of conduit 58 through the cooling coil 20 and out to the atmosphere at the end 59 of the conduit connected to the bottom of cooling coil 20. When the bath has been cooled to the critical temperature of the critical solution contained in the container 12, the critical solution becomes immiscible or cloudy. The film of liquid being circulated through the passageway of the bull's eye will then intercept a portion or all of the light from the source 21 striking the photocell 27. As a result, the output of amplifier 28 will be insufficient to hold relay 29 in the position shown. When relay 29 has dropped so that contact 43 engages a fixed contact 60 a pair of parallel circuits are established which can be completed by the closing of a switch 61. The two parallel circuits comprise, first, the common conductor 41, the armature 39 of the relay 29, contacts 43 and 60, conductors 62, switch 61, conductor 63, pilot light 64, conductor 65 and the power main 32; and, secondly, the common conductor 41, the armature 39, the contacts 43 and 60, conductor 62, switch 61, conductor 66, the primary winding of a transformer 67, conductor 68 and the power supply main 32. With the two parallel circuits completed, when the armature is in the down position and switch 61 closed the pilot light 64 will light and the transformer 67 is energized. The secondary winding of transformer 67 is connected across the resistance element 69 of a voltage divider. One end of the resistance element is connected by means of conductor 70 to the heater 19 that is disposed in the bath. The variable tap 71 of the voltage divider is connected by means of conductor 72 to the other terminal of the heater 19. Therefore, when the armature of the relay 29 is in its down position, heat is supplied to the bath and the pilot light 64 is lighted. When the armature 39 of the relay 29 is in the up position, coolant is supplied to the cooling coil 20 and pilot light 48 is lighted. It will be apparent that only one of the pilot lights can be lighted at a time. However, when equilibrium temperature of the bath and the critical solution contained in container 12 is reached the relay 29 will be energized and de-energized with the clearing and clouding of the critical solution flowing through the bull's eye 23 and as a result, lights 64 and 48 will flash intermittently at short regular intervals. When this equilibrium temperature has once been established, the system will automatically maintain the temperature of the bath constant to a degree of accuracy of plus or minus 0.1° C. for an indefinite period of time without the attention of an operator. The system is entirely automatic and can be operated by anyone who can select the proper critical solution for the container 12 and can operate the switch 31 to initiate the operation of the system.

In Figure 4 there is shown a modified form of critical solution container. This container is formed of glass and like that shown in Figures 2 and 3, is also provided with a stirrer 14. The container, however, differs from that shown in Figures 2 and 3 in that it is simply formed by heating one side of a test tube like cylindrical glass receptacle and by means of tools, similar to those described in connection with the formation of the bull's eye of container 12 a portion of the side is pinched against a spacer element to form the bull's eye 23 having parallel plane lenses. The container of Figure 4 can be used interchangeably with that shown in Figure 1.

Figure 5:
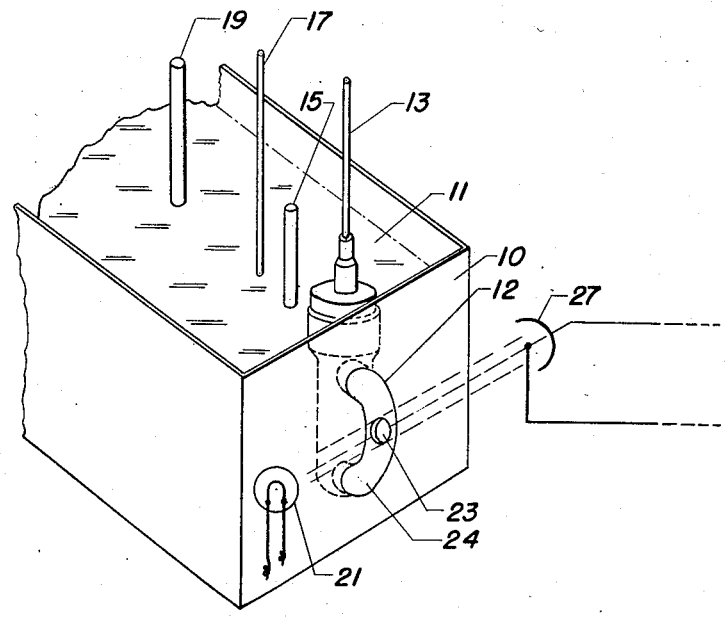
Figure 5 is a modification of the invention shown in Figure 1 and differs therefrom in the disposition of the critical solution container relative to the bath.

A modified form of the invention disclosed in Figure 1 is shown by Figure 5. This form of the invention differs from that disclosed in Figure 1 in the disposition of the critical solution container in the bath 11. The critical solution container is so disposed that the main body of the container is in the bath 11 and the side arm 24 extends through the end wall of the container in such a manner that the bull's eye 23 is located outside the container. With such an arrangement the walls of the container 10 need not be transparent nor does the bath 11 have to be transparent. Light from a source 21 located outside of the container 11 impinges on the bull's eye 23 and the transmitted light from the bull's eye strikes the photocell 27. The entire optical system is located outside of the container.

Figure 6:
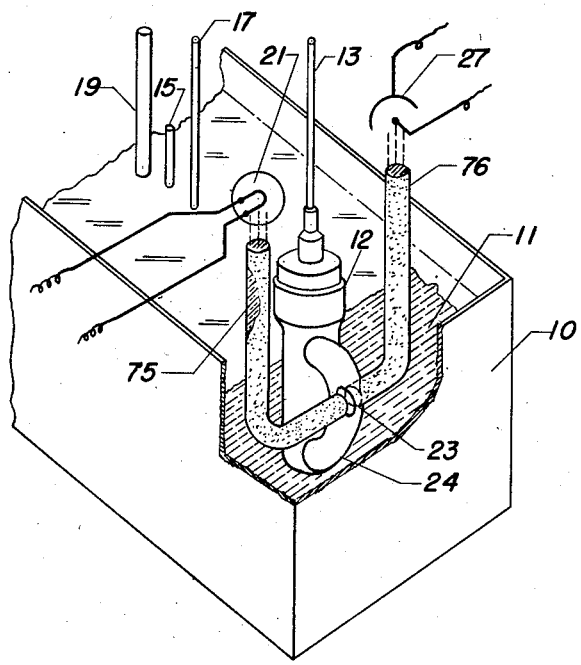
Figure 6 is still another modification of the present invention showing the use of quartz rods for conducting light to and from the bull's eye.

In Figure 6 there is shown still another modification of this invention. This form of the invention, like that disclosed in Figure 5, is adaptable to the control of the temperature of a bath which is enclosed in a container whose side walls are opaque. The critical solution container may be, as shown, like that disposed in Figure 1, or it may take the form illustrated in Figure 4. For the operation of this modification of the invention, advantage is taken of the light bending properties of quartz rods. Light from the source 21 striking the upper end of quartz rod 75 is transmitted by the rod to the bull's eye 23 which is located below the surface of the bath 11. The upper end of rod 75 extends above the surface of the bath and terminates adjacent the light source 21. The lower end of the quartz rod 75 terminates adjacent the bull's eye 23. Light from the quartz rod striking the bull's eye 23 is transmitted by the bull's eye 23 and strikes the bottom end of a similar quartz rod 76 which transmits this light to the photo electric cell 27. The arrangement of quartz rod 76 with respect to the bath and bull's eye 23 is similar to that of quartz rod 75. With such an arrangement the solution forming the bath 11 need not be transparent to the degree required in the operation of the apparatus shown in Figure 1, nor does the container have to be transparent.

Still another modification of the critical solution container is shown in Figures 7 and 8. In this form of the device a cell 77 is formed by securing two plain glass disks 78 and 79 together in parallel spaced relationship with a metallic bellows 80. Bellows 80 is provided so that the critical solution sealed inside the cell on expansion will not rupture the cell. When employing such a cell to control the temperature of a bath it is positioned in the bath on rollers such as those shown at 81 in such a manner that it could be rotated by a similar roller 82 which is fixedly mounted on a shaft 83. Shaft 83, in turn, is adapted to be driven by an electric motor 84. Rotation of the roller 82 will cause the cell 77 to turn on the rollers 81 and thereby agitate the critical solution contained in the cell. Light from the source 21 striking the glass face 78 of the cell at substantially right angles will be transmitted through the cell and will impinge on the photo electric cell 27. It is to be understood that cell 27 is connected in a control circuit such as that disclosed in Figure 1.

A modification of the critical solution container cell as disclosed in Figures 7 and 8 is shown in Figures 9 and 10. This form of the invention differs from that shown in Figures 7 and 8 in that stirring vanes 85 are secured to the inner peripheral surface of the metallic bellows and extend radially inward toward the center of the cell. The vanes stop short of the center to provide clearance for the beam of light to be projected therethrough. The operation of this form of the invention is the same as that described in connection with Figures 7 and 8 with the additional agitating feature occasioned by the vanes 85.

The flexibility of the present invention is enhanced by the exchangeability of critical solution containers. For example, a plurality of critical solution containers can be made up, each containing a mixture of solutions having a predetermined cloud point. In fact, these containers can be made up in advance for as wide a range of temperatures as one is likely to encounter in laboratory work. If such practice is followed it is obvious that a tremendous saving of time can be effected.

In Figure 11 there is shown a graph which teaches the manner of mixing the critical solution for a range of temperatures extending from approximately −27° centigrade to approximately +100° centigrade. Curve I shown on the graph teaches the manner in which the critical solution is mixed for temperatures between −27° centigrade and approximately +55° centigrade, while curve II shows the manner in which the critical solution is mixed for temperatures ranging from approximately 0° centigrade to +110° centigrade. The solutions used with aniline to form the critical solutions for the curves were a solution identified by the trade name "Sovasol 75" which consists of an aromatic petroleum solvent having 75 to 80 percent aromatics by volume, 1.5 percent olefins and the balance naphthenes and paraffins, having an aniline point of 82.0° F. and a boiling range from 325°–386° F.; a solution identified by the trade name "Nujol" which consists of "liquid petrolatum" or white mineral oil, a highly acid refined petroleum fraction of substantially paraffinic nature; and a solution known to the A. S. T. M. as "Stoddard Solvent," designated by the A. S. T. M. as D484-40, and adopted as a standard in 1940. These solutions will be referred to hereinafter by their trade names.

Curve I illustrates the percentages in a mixture of "Sovasol 75" and "Stoddard Solvent" that must be mixed with an equal volume of aniline to obtain critical solutions which have cloudpoints at the temperatures indicated by the curve and which range from approximately −27° C. to approximately +55° C.

Curve II illustrates the percentages in a mixture of "Sovasol 75" and "Nujol" which must be mixed with an equal volume of aniline to obtain critical solutions which have cloudpoints at the temperatures indicated by the curve and which range from approximately 0° C. to approximately +110° C.

With the above teaching it is obvious to those skilled in the art that a great number of critical solutions can be prepared to accurately control the temperature at any desired temperature.

It is to be understood that the present invention is not to be limited to the critical solutions recited above since there are numerous pairs of partially miscible liquids which could be used, for example, acetone and octane, furfural and triptane, water and amyl alcohol, phenol and heptane, etc. It is apparent from the above teaching that by resorting to the use of a mixture of three liquids a still larger number of combinations becomes available and a higher degree of flexibility is realized.

We claim:

1. An apparatus for controlling the temperature of a confined medium that comprises in combination a container adapted to be at least in part exposed to said medium, an organic solution in said container having a cloudpoint temperature which is equal to that to which the confined medium is to be controlled, at least a portion of said container being capable of transmitting light, means for projecting light on that portion of the container, means for detecting light transmitted by the container and critical organic solution therein, heat exchange means for altering the temperature of the medium whose temperature it is desired to control, means for energizing the heat exchange means to vary the temperature of the confined medium in the direction of the cloudpoint temperature of the critical organic solution, and means responsive to the light detector for selectively controlling the energizing means to maintain the temperature of the confined medium at that temperature.

2. An apparatus for controlling the temperature of a confined medium that comprises in combination a container adapted to be at least in part exposed to said medium, an organic solution in said container having a cloudpoint temperature which is equal to that to which the confined medium is to be controlled, at least a portion of said container being capable of transmitting light, means for projecting light on that portion of the container, means for detecting light transmitted by the container and critical organic solution therein, heat exchange means consisting of heating and cooling means for altering the temperature of the medium whose temperature it is desired to control, means for energizing one of the heat exchange means to vary the temperature of the confined medium in the direction of the cloudpoint temperature of the critical organic solution, means for energizing the other heat exchange means, and means responsive to the light detector for alternately selecting the energizing means when the critical organic solution temperature has been reached to maintain the temperature of the medium constant at that temperature.

3. An apparatus for controlling the temperature of a confined medium that comprises in combination a container adapted to be at least in part exposed to said medium, an organic solution in said container having cloudpoint temperature which is equal to that to which the confined medium is to be controlled, at least a portion of said container being capable of transmitting light, means for projecting light on that portion of the container, means for detecting light transmitted by the container and critical organic solution therein, cooling means for altering the temperature of the medium whose temperature it is desired to control, means for energizing the cooling means to vary the temperature of the confined medium in the direction of the cloudpoint temperature of the critical organic solution, and means responsive to the light detector for intermittently activating the energizing means when the cloudpoint temperature has been reached to maintain the temperature of the confined medium at that temperature.

4. An apparatus for controlling the temperature of a confined medium that comprises in combination a container adapted to be at least in part exposed to said medium, a solution in said container having critical solution temperature which is equal to that to which the confined medium is to be controlled, at least a portion of said container being capable of transmitting light, means for projecting light on that portion of the container, said means including a quartz rod, means for detecting light transmitted by the container and critical solution therein, said detecting means including a quartz rod, heat exchange means for altering the temperature of the medium whose temperature it is desired to control, means for energizing the heat exchange means to vary the temperature of the confined medium in the direction of the critical solution temperature of the critical solution, and means responsive to the light detector for intermittently activating the energizing means to maintain the temperature of the confined medium at that temperature.

5. An apparatus for controlling the temperature of a confined medium that comprises in combination a container adapted to be at least in part exposed to said medium, said container having means defining a restricted passageway through which a film of liquid can flow, a solution in said container having a critical solution temperature which is equal to that to which the confined medium is to be controlled, circulating means for circulating the solution in said container and through said restricted passageway, at least a portion of said container being capable of transmitting light, means for projecting light on that portion of the container, means for detecting light transmitted by the container and critical solution therein, heat exchange means for altering the temperature of the medium whose temperature it is desired to control, means for energizing the heat exchange means to vary the temperature of the confined medium in the direction of the critical solution temperature of the critical solution, and means responsive to the light detector for intermittently activating said heat exchange means to maintain the temperature of the confined medium at that temperature.

6. An apparatus for controlling the temperature of a confined medium that comprises in combination a container adapted to be at least in part exposed to said medium, said container having a side arm through which a solution can be circulated, a solution in said container having a critical solution temperature which is equal to that to which the confined medium is to be controlled, means for circulating the solution in the container and side arm thereof, at least a portion of the side arm of said container being capable of transmitting light, means for projecting light on that portion of the side arm of the container, means for detecting light transmitted by the side arm of the container and critical solution therein, heat exchange means for altering the temperature of the medium whose temperature it is desired to control, means for energizing the heat exchange means to vary the temperature of the confined medium in the direction of the critical solution temperature of the critical solution, and means responsive to the light detector for intermittently activating said heat exchange means to maintain the temperature of the confined medium at that temperature.

7. An apparatus for controlling the temperature of a confined medium that comprises in combination a container adapted to be at least in part exposed to said medium, a solution in said container having a critical solution temperature corresponding to the desired temperature of the confined medium, means defining internal vanes in said container, means for rotating said container to effect a stirring of the contained solution by the vanes, at least a portion of said container being capable of transmitting light, means for projecting light on that portion of the container, means for detecting light transmitted by the container and critical solution therein, heat exchange means for altering the temperature of the medium whose temperature it is desired to control, means for energizing the heat exchange means to vary the temperature of the confined medium in the direction of the critical solution temperature of the critical solution, and means responsive to the light detector for intermittently activating the energizing means to the temperature of the confined medium at that temperature.

CLAYTON W. BROWN.
PAUL V. KEYSER, JR.

References Cited in the file of this patent

UNITED STATES PATENTS

| Number | Name | Date |
|---|---|---|
| 1,002,635 | Bratkowski | Sept. 5, 1911 |
| 1,794,222 | Whitney | Feb. 24, 1931 |
| 1,970,613 | McDill | Aug. 21, 1934 |
| 2,197,190 | Mott-Smith | Apr. 16, 1940 |
| 2,232,998 | Cernohouz et al. | Feb. 25, 1941 |
| 2,361,235 | Pick | Oct. 24, 1944 |
| 2,502,844 | Hildreth | Apr. 4, 1950 |